US00RE34288E

United States Patent [19]

Beck et al.

[11] E Patent Number: Re. 34,288

[45] Reissued Date of Patent: Jun. 22, 1993

[54] DEVICE FOR FOLDING AND SEALING SHEETS

[75] Inventors: Christian A. Beck; Marc C. Breslawsky, both of Ridgefield; Hans R. Forster, Trumbull, all of Conn.

[73] Assignee: Pitney Bowes Inc., Stamford, Conn.

[21] Appl. No.: 677,013

[22] Filed: Mar. 28, 1991

Related U.S. Patent Documents

Reissue of:

[64] Patent No.: 4,816,108
Issued: Mar. 28, 1989
Appl. No.: 72,821
Filed: Jul. 8, 1987

[51] Int. Cl.[5] ..... B42C 9/00; B65C 3/00; B31B 1/60; B31F 1/00

[52] U.S. Cl. ..... 156/356; 156/443; 156/477.1; 156/204; 156/217; 156/227

[58] Field of Search ..... 156/217, 227, 204, 356, 156/477.1, 443; 53/562; 493/394, 421

[56] References Cited

U.S. PATENT DOCUMENTS

| | | | |
|---|---|---|---|
| 2,373,082 | 4/1945 | Staelin | 156/484 |
| 3,193,983 | 7/1965 | Wells | 53/117 |
| 3,416,785 | 12/1988 | Sherman | 493/420 |
| 3,495,818 | 2/1970 | Marin | 270/68 |
| 3,510,122 | 5/1970 | Gavaghan | 270/68 |
| 3,516,655 | 6/1970 | Schmeck | 270/68 |
| 3,874,276 | 4/1975 | Froehlig | 156/227 |
| 3,975,009 | 8/1976 | Brown | 493/421 |
| 3,983,679 | 10/1976 | Zemke | 53/21 |
| 4,196,562 | 4/1980 | Hirchman | 156/227 |
| 4,202,621 | 5/1980 | Yoshimura et al. | 493/420 |
| 4,221,703 | 3/1982 | Schwaertzel | 358/291 |
| 4,317,136 | 2/1982 | Keyt | 358/256 |
| 4,317,138 | 2/1982 | Bryan | 358/291 |
| 4,473,425 | 9/1984 | Baughman et al. | 158/354 |
| 4,530,731 | 7/1985 | Bradley | 156/227 |
| 4,573,672 | 3/1986 | Lehmann et al. | 493/421 |
| 4,612,220 | 9/1986 | Baxter | 156/227 |
| 4,668,212 | 5/1987 | Kotani | 493/421 |

*Primary Examiner*—Caleb Weston
*Attorney, Agent, or Firm*—Robert H. Whisker; Melvin J. Scolnick

[57] ABSTRACT

Apparatus for folding and sealing sheets comprises means for feeding a sheet, means for bulging a portion of the sheet, means for folding the bulged portion, and means for adhering a sheet portion face to face to a portion thereof trailing the fold. Apparatus for enhancing the security of information on a front side of a sheet comprises said apparatus for folding and sealing sheets, where a plurality of folds are provided and the front side of said sheet is concealed from view inside said folds, said folds being sealed along the lateral side edge portions thereof. Address information may be applied adjacent the trailing edge of said sheet, and the trailing edge portion is folded to expose the address information to view.

17 Claims, 9 Drawing Sheets

Fig. 5.
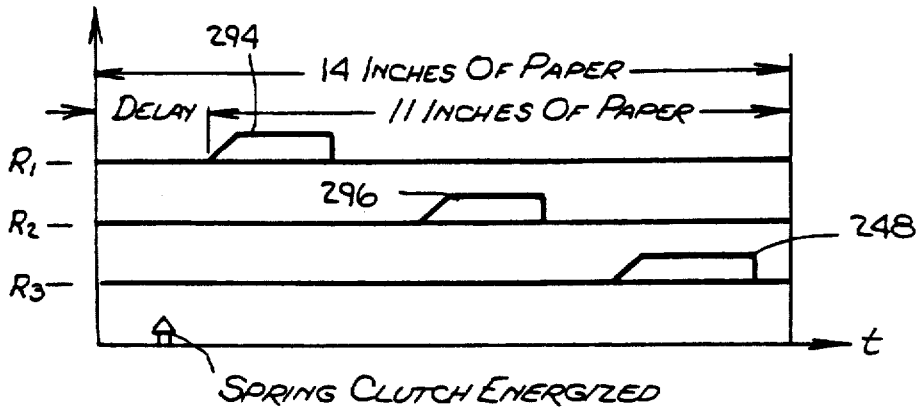
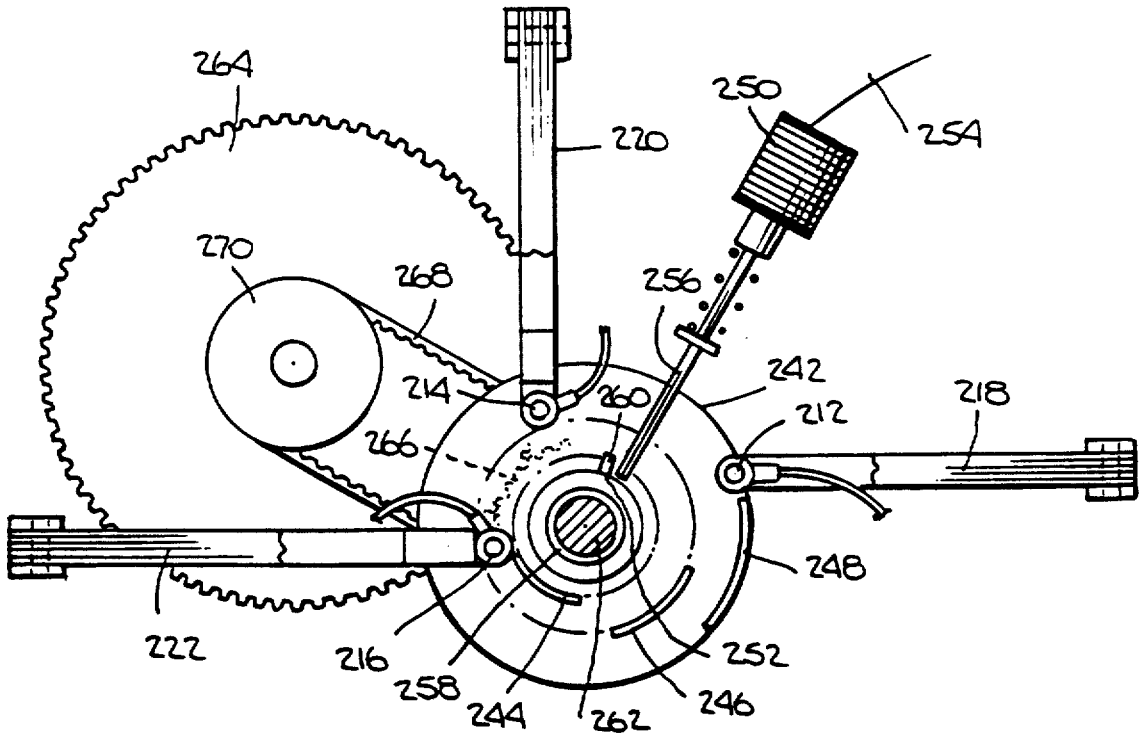
Fig. 4.

DEVICE FOR FOLDING AND SEALING SHEETS

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates to a method and device for folding and sealing sheets, and more particularly to a method and device for enhancing the security of information applied to a front side of a sheet by folding it face to face and sealing the folds along the lateral edges of the sheet so that the information is concealed and sealed inside said folds. In a preferred embodiment, address information is applied adjacent the trailing edge of the sheet, and the last fold leaves the address information exposed but conceals and seals the other information within said folds.

The present invention is designed to fold and seal one sheet of paper at a time. If the communication involves more than one sheet, each sheet or page will be folded separately.

(2) Description of the Prior Art

Devices for folding sheets are generally known in the prior art. For example, U.S. Pat. No. 3,516,665 to Schmeck, U.S. Pat. No. 3,510,122 to Gavaghan, and U.S. Pat. No. 3,416,785 to Sherman all show devices for folding sheets, which include feeding rollers for feeding a sheet, a buckle chute for receiving the sheet and causing it to buckle or bulge, and folding rollers for grasping the bulge in the nip thereof and creasing the sheet to fold it as the sheet is pulled through. A second buckle chute can be disposed after the folding rollers for receiving the folded edge of the sheet, bulging it a second time, and folding it by further rollers to form a second fold. U.S. Pat. No. 3,570,335 to Marin discloses a folding machine for paper sheets that includes a paperworking assembly for performing operations such as perforating, scoring, or slitting each folded sheet. However, these patents do not disclose the sealing of the folded sheet.

The use of adhesives to bind sheets together is also generally known. For example, U.S. Pat. No. 4,473,425 to Baughman et al. describes applying a line of adhesive to one surface of a sheet adjacent one side edge of the sheet as the sheet is moved along a path. A plurality of sheets are moved to an assembly station where they are jogged to align the sheets of the set. Pressure is then applied to the sheets over the line of adhesive to form a booklet, but this patent does not show the application of adhesive to the inside portions of a fold on a single sheet of paper for sealing the folds face to face of said single sheet.

Facsimile machines, such as the Pitney Bowes Model 8400, operate by receiving facsimile information which is reproduced onto a sheet of paper and which is then fed into a storage tray for retrieval. Other Pitney Bowes Facsimile machines are the models 8100, 8600, 8800, and 8900. Security may be a problem because the sheet is readily available for any passerby to read. This problem may be particularly acute where the information is received in off business hours, such as messages received in the United States from Europe in the early hours of the morning.

U.S. Pat. No. 4,321,703 to Schwäertzel et al. describes a transmission system for electronic transmission of in-house mail, which is said to fulfill security requirements that the transmitted documents in fact reach the properly designated recipient terminals. Yet this patent is not directed to ensuring the security of an information-bearing sheet once it has been deposited at the proper recipient terminal.

SUMMARY OF THE INVENTION

In accordance with one aspect of the present invention, a method is provided for folding and sealing sheets comprising feeding a sheet into and along a path for folding and sealing it, and while so feeding the sheet, bulging transversely out of the plane of the sheet a portion of the sheet trailing its leading edge, folding the bulged portion of the sheet, passing the formed fold forward in a direction opposite the direction of the formed bulge as a new leading edge, and adhering a portion of the sheet face to face to a portion thereof trailing backward of the fold. The feeding, bulging, folding, and adhering steps can be repeated to form second and third folds. In one aspect of the invention, during the third folding step, a trailing end portion of the sheet extending backward from said third fold is laid onto the folded portions of the sheet.

Apparatus is also provided comprising means for carrying out the method of the present invention, said apparatus comprising means for feeding a sheet, means for bulging the sheet, means for folding the bulged portion of the sheet, and means for adhering a portion of the sheet adjacent said bulge face to face to a portion trailing said bulge. Additional such means can be spaced along the path of travel of a sheet to form further folded and sealed portions.

Further in accordance with the present invention, apparatus is provided for enhancing the security of information applied to one side of a sheet emanating from an information reproduction means, the apparatus comprising means for accepting a sheet from the reproducing means, means for feeding the sheet along a path, means for bulging the sheet in a direction opposite the information side, means for applying adhesive to a portion of said sheet adjacent the formed bulge, and means for folding the sheet so that the information is concealed inside the sheet, a portion of which is adhered face to face to a portion thereof trailing the fold. Also provided is a housing for containing the feeding, bulging, adhesive applying, and folding means therein.

Apparatus is also provided for printing address information adjacent the trailing edge of the sheet, and the final fold is formed in an opposite direction so that a trailing edge portion of the sheet is sealed face to back to leave the address information exposed.

It is an object of the present invention to provide a method and apparatus for folding and sealing sheets.

It is a further object of the present invention to provide a method and apparatus for folding and sealing sheets for use in conjunction with an information reproduction means to enhance the security of information reproduced thereby on sheets of paper.

It is a further object of the present invention to provide a method and apparatus for folding and sealing a sheet containing confidential information and address information, whereby the confidential information is folded and sealed inside the folds and the address information is exposed on an outside panel.

Further objects and advantages of the present invention can be seen from the accompanying drawings and detailed description of the preferred embodiments set forth below.

BRIEF DESCRIPTION OF THE DRAWINGS

FIG. 4 is a side view of the adhesive applicator system of the present invention;

FIG. 5 is a timing chart for the application of adhesive;

DETAILED DESCRIPTION OF THE PREFERRED EMBODIMENT

Figure 1:
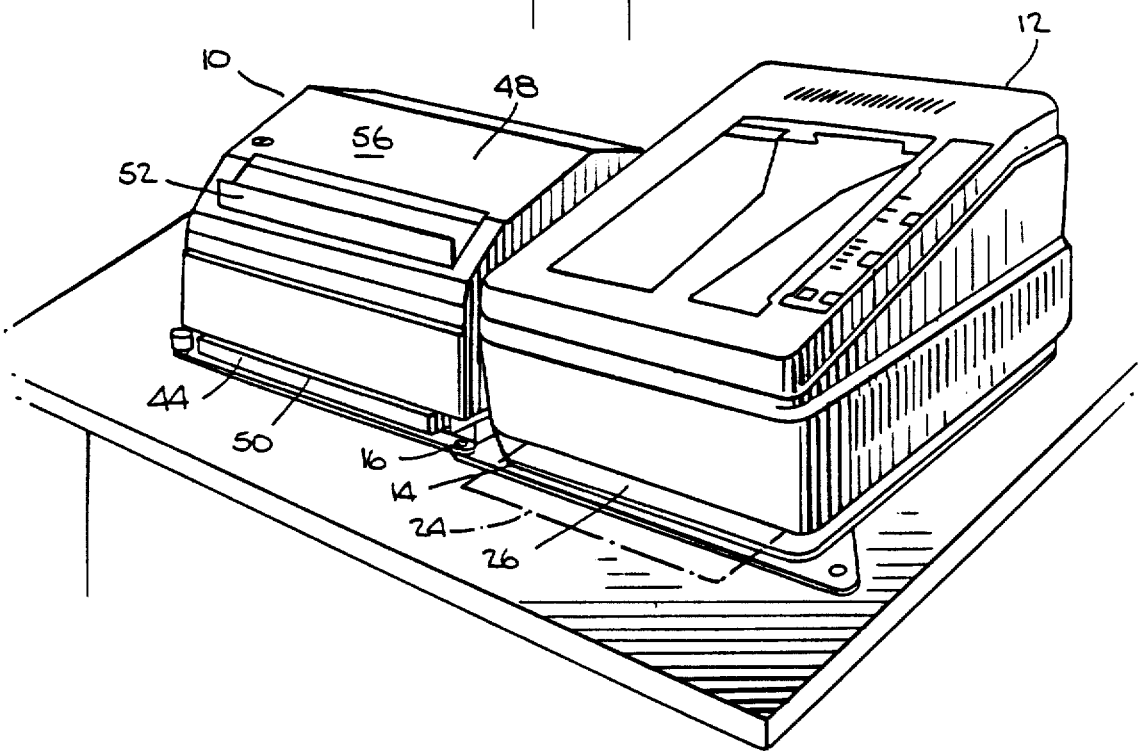
FIG. 1 is a front perspective view showing the apparatus of the present invention mounted adjacent a facsimile machine.

The apparatus of the present invention for folding and sealing sheets is indicated generally by the numeral 10 in FIG. 1 and is shown mounted next to a tabletop facsimile machine 12, such as for example the Pitney Bowes Model 8400. Machine 12 is a well known standard facsimile machine for receiving information transmitted from a remotely located sending unit over a suitable transmission medium and reproducing said information at the receiving unit, here machine 12, by applying said information in a suitable format to a sheet of paper, which is typically either $8\frac{1}{2}\times11$ inches or $8\frac{1}{2}\times14$ inches in size. A sheet 24 bearing said information is then ejected from said machine 12 from an exit chute indicated as 26 in FIG. 1. The sheet 24 will be 3 inches longer than the original sheet transmitted through the machine 12.

An original $8\frac{1}{2}\times11$ inches document thus transmitted will be $8\frac{1}{2}\times14$ inches and an $8\frac{1}{2}\times14$ inches original will be $8\frac{1}{2}\times17$ inches after having been folded and sealed in the machine 10.

Apparatus 10 can be used in conjunction with a copier, a printer, or in general any information reproducing or sheet handling type of equipment where sheets are to be folded and sealed. In addition to operating as an integrated system with a facsimile, copier, or printer unit, apparatus 10 can also operate as a stand-alone sheet folder and sealing machine. However, because apparatus 10 is particularly useful in conjunction with a facsimile machine, the preferred embodiment herein will be described in terms of cooperation with facsimile machine 12.

Figure 2:
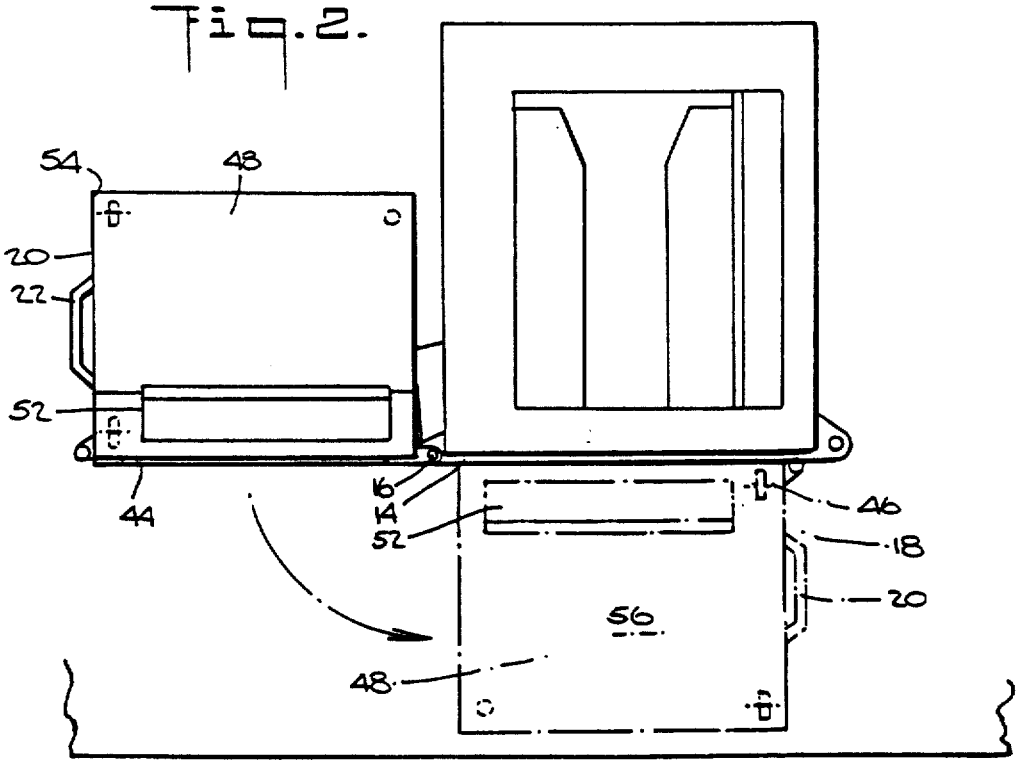
FIG. 2 is a top view of FIG. 1, showing the apparatus of the present invention in engaged and non-engaged positions with the facsimile machine.

As seen in FIGS. 1 and 2, apparatus 10 is movably supported adjacent facsimile machine 12 on frame 14, which has a pivoting support means 16 enabling apparatus 10 to be displaced to and from an engaged and secure locked position 18 with machine 12 as shown in FIG. 2 for accepting sheets from the facsimile machine 12, which are ejected from exit chute 26. The unengaged position 20 is shown in phantom. Handle 22 facilitates displacing apparatus 10 to and from the engaged and secure locked position 18. Also provided is an adjustment (not shown) for facilitating alignment between apparatus 10 and machine 12.

When engaged in position 18, apparatus 10 receives sheet 24 as it exits from machine 12. Apparatus 10 receives the sheet 24 directly from exit chute 26, and apparatus 10 is closely aligned therewith to ensure confidentiality. It is intended that the physical communication between machine 12 and apparatus 10 be so close as possibly to eliminate the opportunity to view the sheet 24 as it passes from machine 12 to apparatus 10. A shield 44 is placed between the two devices for covering the path of travel to further ensure this capability, and locking means such as key-lock device 46 is included at the junction of machine 12 with apparatus 10 so that apparatus 10 can be locked into the engaged position 18 shown in FIG. 2.

Further toward the goal of achieving security, apparatus 10 comprises a housing 48 for enclosing the folding and sealing apparatus described in detail below. Apparatus 10 also has a tray 52 for receiving the folded and sealed sheets after they pass through apparatus 10. Apparatus 10 has a keylock device 54 included on the access cover 56 to restrict unauthorized access to the internal portion of apparatus 10.

Figures 7, 14, 15, 16:
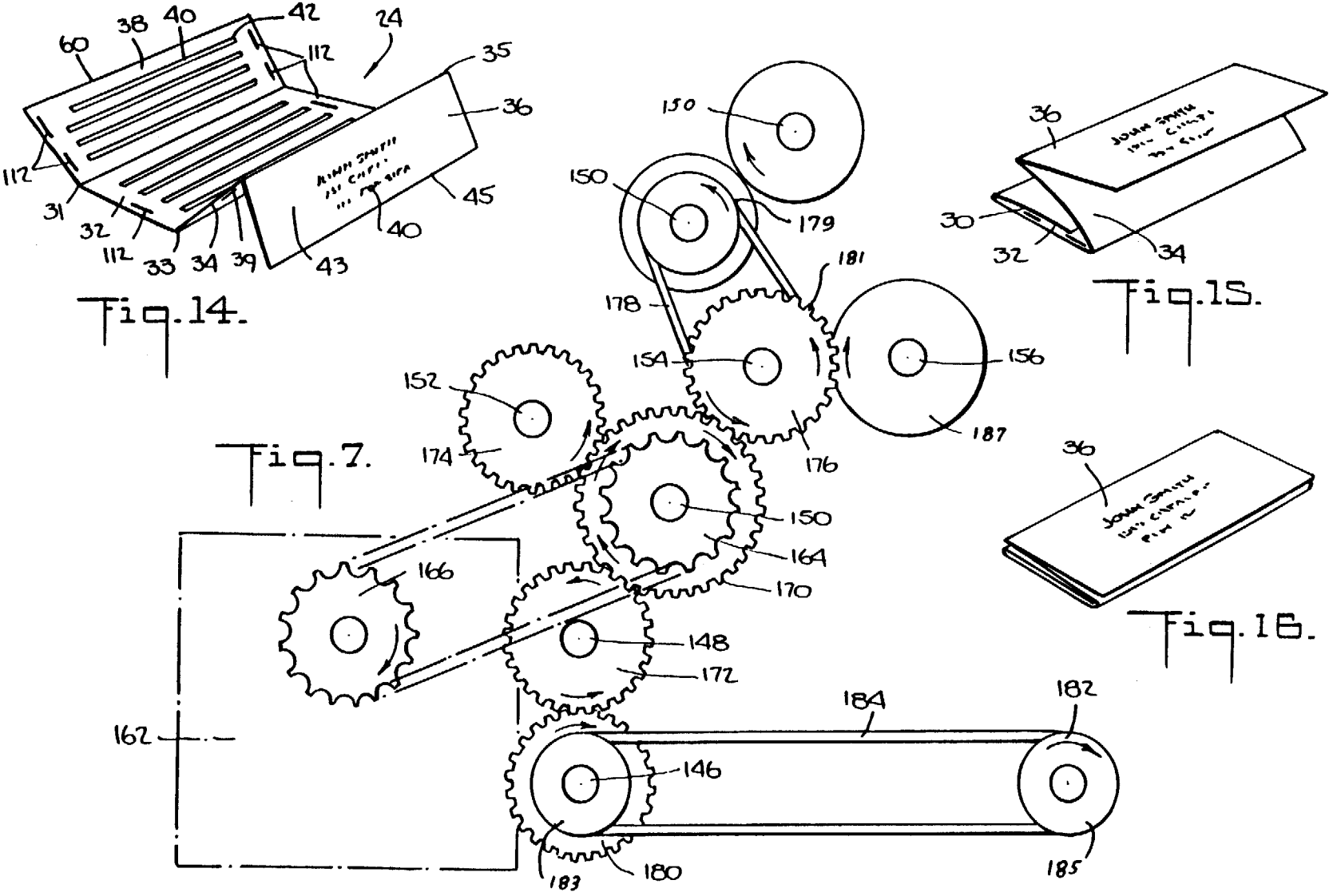
FIG. 7 shows the drive train for the present invention.
FIGS. 14, 15, and 16 show the preferred folding pattern for the present invention.

Information may be applied to sheet 24 by the facsimile machine 12 in any number of different formats. One particularly preferred format is shown in FIGS. 14, 15 and 16, which depicts a sheet 24 that has been folded in accordance with a preferred aspect of the present invention. Sheet 24 exits from machine 12 with the first or leading edge 60 and the last or trailing edge 45. Sheet 24 has information on a first or front side 38 thereof, this information being indicated generally by lines 40. Sheet 24 ordinarily would have no information on the back side 39. Sheet 24 has been folded into four panels 30, 32, 34, and 36 by folding the sheet three times along the three folds 31, 33, and 35. It can be seen from FIG. 14 that folds 31 and 33 are in a first direction, or toward the information side 38, while fold 35 is in the opposite direction, or away from the information side 38 and toward the back side 39.

In accordance with the present invention, information 40 may be formatted to fall into two categories. The first category is for the information applied to panels 30, 32, and 34, which panels are taken together to define a region 42 on sheet 24. Said information in region 42 will be covered or concealed from view when panels 30, 32 and 34 are folded in a face to face relationship as indicated by the directions of folds 31 and 33 shown in FIGS. 14 and 15. Accordingly, information on panels 30, 32, and 34 may constitute confidential information to be hidden from view inside the folds.

By contrast, panel 36 and the information applied thereto will be exposed to view because of the direction of fold 35 shown in FIGS. 14, 15 and 16. In the preferred embodiment, the information on panel 36 may constitute address information identifying the intended recipient of the message or confidential information received at facsimile machine 12 from a remotely located sending unit (not shown). In accordance with the present invention, machine 12 comprises means for printing address information in a zone 43 defined by panel 36 in FIG. 14, said zone 43 or panel 36 trailing the information panels 30, 32, and 34 and being adjacent trailing edge 45.

The means for printing address information on panel 36 can comprise an address printing function built into the central controller of the facsimile machine 12, such as a microprocessor. The microprocessor controls the information receiving and printing functions of machine 12. On the sending end of the facsimile system (not shown), there is provided an appropriate operator keying device to input the address through a keyboard or other operator control directly linked to the sending facsimile device. The microprocessor in the receiving unit or facsimile machine 12 is programmed to retain the desired address information, which is then printed on panel 36 adjacent the trailing end 45 of sheet 24.

Accordingly, as shown in FIGS. 14, 15, and 16, the last panel 36 bears the address on the outside of the finished document when the folding pattern is such as to lay the trailing end portion or panel 36 extending backward from fold 35 onto the folded portions of sheet 24. In this way, the front side of said trailing end portion ends up outside the folds, because the last fold 35 is in a direction opposite to the direction of the previous two folds.

The basic operation of apparatus 10 for achieving the results shown in FIGS. 14, 15, and 16 is best understood with reference to the schematic diagrams of FIGS. 10, 11, 12, and 13 and a description of the method of the present invention for folding and sealing a typical single sheet 24 as it progresses through apparatus 10. The structural details of the apparatus 10 will then be described further below.

Figure 10:
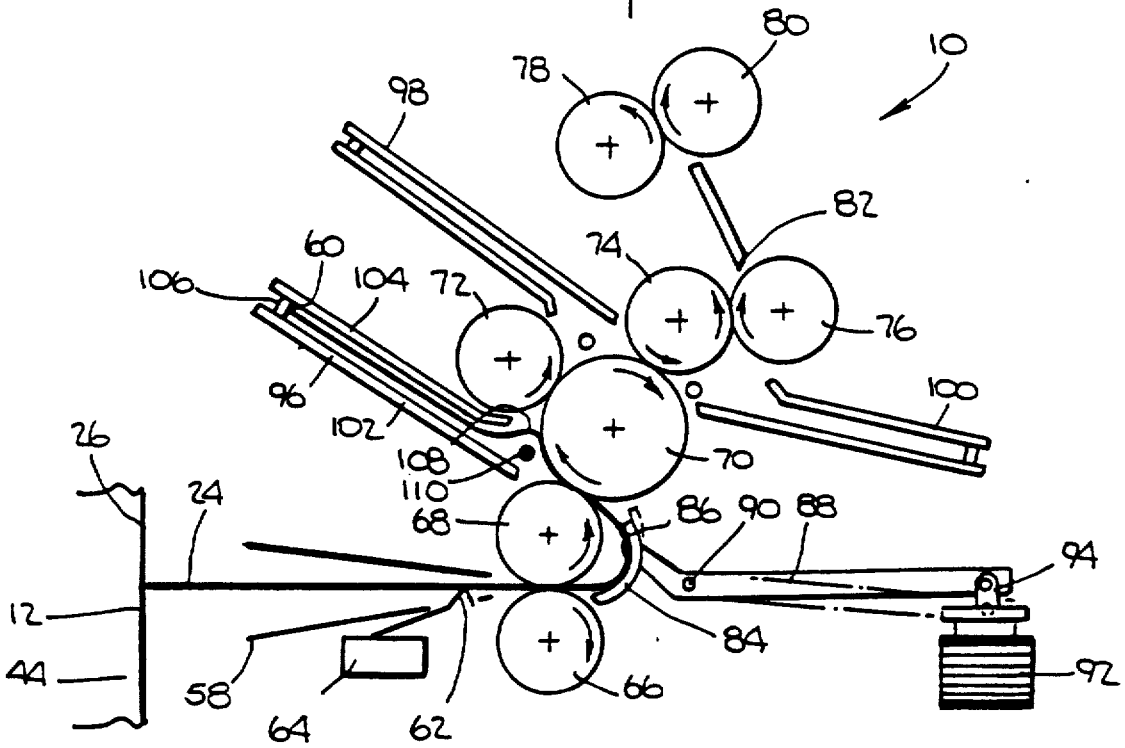
FIGS. 10, 11, 12, and 13 are schematic diagrams describing the method of the present invention.

FIG. 10 shows sheet 24 exiting from facsimile machine 12, the machine 12 being indicated only generally by break lines. The information or front side 38 of sheet 24 faces upwardly. Sheet 24 is urged by the exit rollers of machine 12 (not shown) along a paper guide 58 in communication with exit chute 26. Sheet 24 is protected from outside view by shield 44, as shown in FIG. 1.

The leading edge 60 of sheet 24 encounters lever 62 of trip switch 64 and depresses it, thereby activating apparatus 10 by energizing the feeding and folding rollers 66 through 80, the details of which are described more fully below. Trip switch 64 also activates a timing means (not shown) for measuring time periods important for synchronizing the adhesive application system, as described below.

The sheet 24 is fed along a path indicated only generally by numeral 82, which path 82 is defined generally by the nips of cooperating rollers in the following order: 68 and 66, then 68 and 70, then 70 and 72, then 70 and 74, then 74 and 76, and finally 78 and 80. The sheet 24 is folded and sealed at various stations along path 82, as will be described now in detail, to achieve the result shown in FIGS. 14, 15, and 16.

The leading edge 60 of sheet 24 is picked up in the nip of rollers 66 and 68 and is fed forward until edge 60 encounters paper turn around guide 84, which is a curved surface 86 disposed in the path of travel of leading edge 60 to deflect sheet 24 upward into the nip of rollers 68 and 70.

Curved surface 86 is mounted on pivotable arm 88, which in turn is supported on pivot point 90. Arm 88 is connected to solenoid 92 through linkage means 94 and is displaceable to and from the engaged position shown in FIG. 10. In the engaged position, surface 86 deflects leading edge 60 into rollers 68 and 70. In a second position [shown in phantom in FIG. 10], surface 86 is pivoted upward to permit sheet 24 to continue through roller pair 66 and 68 more or less horizontally, bypass rollers 68 and 70, and pass along a bypass chute 93 into a bypass stacking tray 95. In effect, solenoid 92 can be operated by the key-lock operator to remove apparatus 10 from the output of machine 12 to permit direct exit of those sheets not requiring folding and sealing.

When the surface 86 is disposed in path 82, as shown in FIG. 10, leading edge 60 is deflected upwardly and backwardly into rollers 68 and 70, and, while being so fed, enters a first buckle chute 96. Buckle chute 96, and also the second and third buckle chutes 98 and 100 to be further described below, may be of any desired or known construction for the purposes of this invention. However, for illustration purposes only, as shown in FIG. 10 buckle chute 96 comprises a pair of closely spaced parallel plates 102 and 104 having between them an adjustable stop element 106. Stop element 106 provides an abutment that stops the movement of leading edge 60 as it moves through chute 96. The stop 106 is shown in an extreme position for accommodating the $8\frac{1}{2} \times 17$ inch sheet. When the stop 106 is pushed to the alternate position, an $8\frac{1}{2} \times 14$ inch sheet is folded to the desired size.

Stopping the motion of leading edge 60 when it abuts stop 106 and simultaneously continuing to feed sheet 24 causes a portion of sheet 24 backward of edge 60 to bulge transversely out of the plane of the sheet in the direction shown in FIG. 10. It is understood that any means for bulging sheet 24 could be used as well, such as for example a blast of compressed air or an extendable arm.

Buckle chute 96 is disposed so that the direction of formed bulge 108 in sheet 24 is toward rollers 70 and 72, which grasp bulge 108 in the nip therebetween, crease or fold bulge 108, and pull the sheet 24 therethrough to form the first fold 31. It is further to be noted that, because bulge 108 has been formed in a direction away from the front or information side 38, any information on what is to become panels 30 and 32 will be concealed inside the fold.

As bulge 108 is formed and folded, adhesive is simultaneously applied to a portion of the side of sheet 24 lying opposite the direction of the bulge 108, here the information side 38. This adhesive is applied by a mechanism described in detail below; with respect to FIG. 10, this adhesive applying means is represented only by dot 100, which is darkened to indicate its being in an operative state to apply adhesive at this point in the cycle of apparatus 10. The adhesive is preferably applied to both lateral edge portions of the side of sheet 24 bearing information and can be applied to both panels 30 and 32, as denoted by numeral 112 in FIG. 14. However, other patterns are also possible so long as the adhesive is applied to a portion of sheet 24 that is to be inside the first fold.

The adhesive applying means represented by dot 110 is operated to apply adhesive at the correct time to sheet 24. Trip switch 64 senses the presence of leading edge 60 when lever 62 is depressed, and a timing means such as a clock (not shown) begins a time out period. Because sheet 24 is advanced along path 82 at a substantially uniform average speed, whether said advancement is continuous or stop and go, it is possible to time when leading edge 60 will form bulge 108. At the proper time after the leading edge 60 is sensed by switch 64, the adhesive applicator 110 spaced adjacent the roller pair 70 and 72 is moved in response to the timing means into alignment with a lateral edge portion of the side 38 of sheet 24 opposite to the direction of bulge 108.

The adhesive is dispensed onto the sheet 24 as the sheet feeds along path 82 and is drawn into the rollers 70 and 72, thereby accomplishing the deposit of a thin strip of adhesive along the edge portions. However, the sheet 24 could also be subjected to periodic, or stop and go movement, and the adhesive applying means could move in and out to apply small dots of adhesive.

In the preferred embodiment, at a further time after the leading edge 60 is sensed, such time being chosen to permit application of a strip of adhesive corresponding to the length of the fold to be formed, the adhesive applicator 110 is withdrawn from alignment with sheet 24 and the dispensing of adhesive ceases.

As the bulged portion 108 is folded by rollers 70 and 72, the formed fold 31 is then fed forward by rollers 70 and 72 as a new leading edge 116 with the portion of the sheet 24 to which adhesive was applied at 110 sealed face to face to a portion of the sheet backward of fold 31. Consequently, any information inside said fold is concealed from view.

Depending upon the length of sheet 24 and the size of the first fold, which can be adjusted by positioning stop 106, the folding and sealing operation may be complete at this point, and the folded and sealed sheet with the one fold therein can be passed on to a storage or stacking tray. However, it may be desirable to form a number of successive sealed folds in a sheet, and any number of such folds can be formed by adding further sets of buckle chutes and feeding and folding rollers along path 82.

Figure 11:
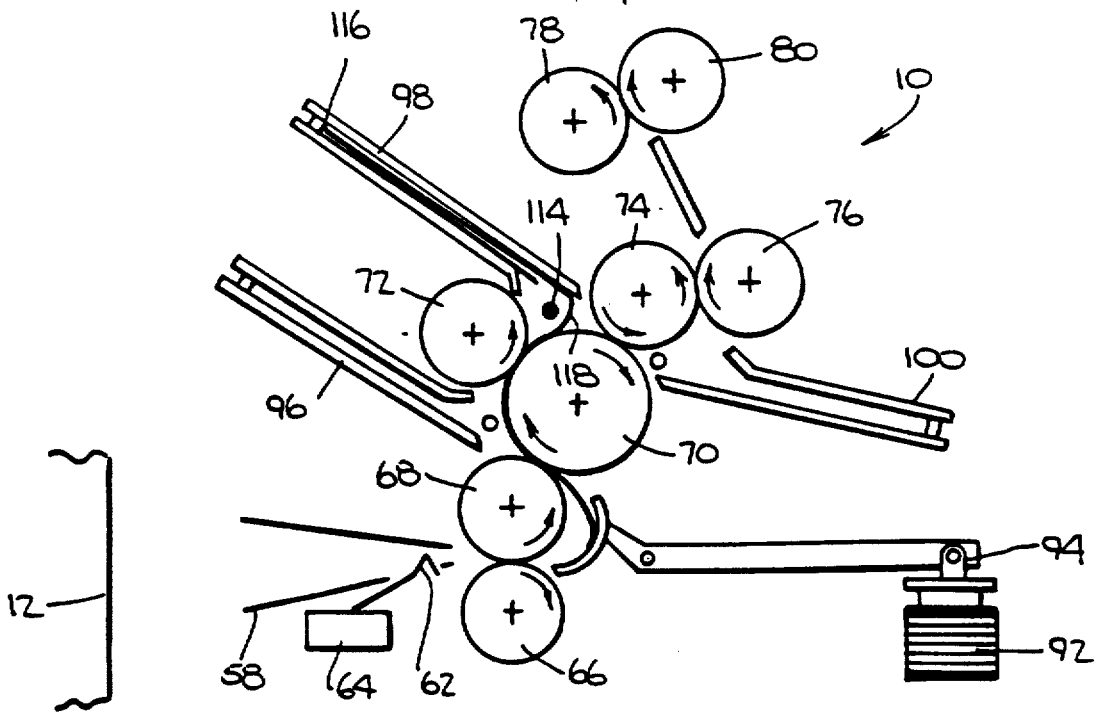

A second folding step, with accompanying adhesive applying means, is depicted in FIG. 11. Rollers 70 and 72 continue to feed sheet 24 forward, and new leading edge 116 feeds into buckle chute 98, is stopped, and forms a bulge at 118. Adhesive is applied by adhesive applicator 114, and rollers 70 and 74 grasp bulge 118, fold it into a second fold 33, and pass the second formed fold 33 forward as a next new leading edge 122. As the sheet portions with adhesive thereon pass through rollers 70 and 74, the face to face adhered portions formed by rollers 70 and 72 are sealed face to face to a further backward portion of the sheet 24. The direction of bulge 118 is chosen to be opposite to the information side 38 of sheet 24, so the second fold 33 also conceals a further portion of the information therein.

Figure 12:
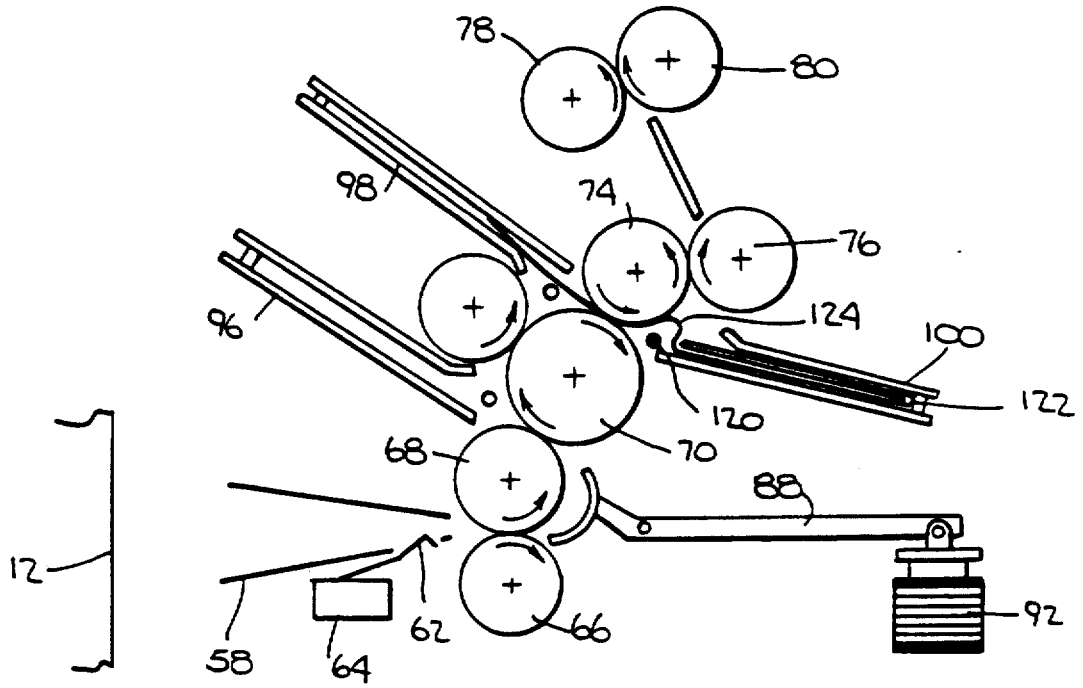

FIG. 12 depicts a third and, in the preferred embodiment, the final folding and sealing step of the present method. Rollers 70 and 74 feed sheet 24 forward with a next new leading edge 122 feeding into buckle chute 100, where its forward motion is stopped. A third bulge is formed at 124, adhesive is applied at 120, and folding takes place between rollers 74 and 76. The further formed or third fold 35 is now passed forward as a further new leading edge 127, with the face to face sealed portions of the sheet 24 from previous folds adhered face to face to a further backward portion of the sheet. If the length of the three folds combined is chosen to be approximately equal to the total length of the sheet, as in the preferred embodiment, then in the third folding and sealing operation the said face to face sealed portions of the sheet from the previous two folds are adhered face to face to a trailing edge portion of the sheet.

Additionally, while the third fold 35 can in accordance with the present invention be formed in the same direction as the previous two folds, if the address information as described above is applied to panel 36 adjacent the trailing edge of sheet 24 and is to remain visible after the third folding and sealing step, as depicted in FIGS. 14, 15, and 16, then the third and final fold is formed in a direction opposite to that of the previous two folds. As shown in FIG. 12, buckle chute 100 is disposed for forming a bulge 124, this time in a direction opposite to the direction of the previous two bulges, whereby the information side of sheet 24 adjacent the trailing edge of the sheet on panel 36 is exposed to the outside of said fold. After adhesive is applied at 120 and bulge 124 is folded by rollers 74 and 76, then the next formed fold is passed forward as a further new leading edge with said face to face sealed portions of the sheet adhered face to back to a trailing edge portion of the sheet, thereby leaving the address information exposed.

Figure 13:
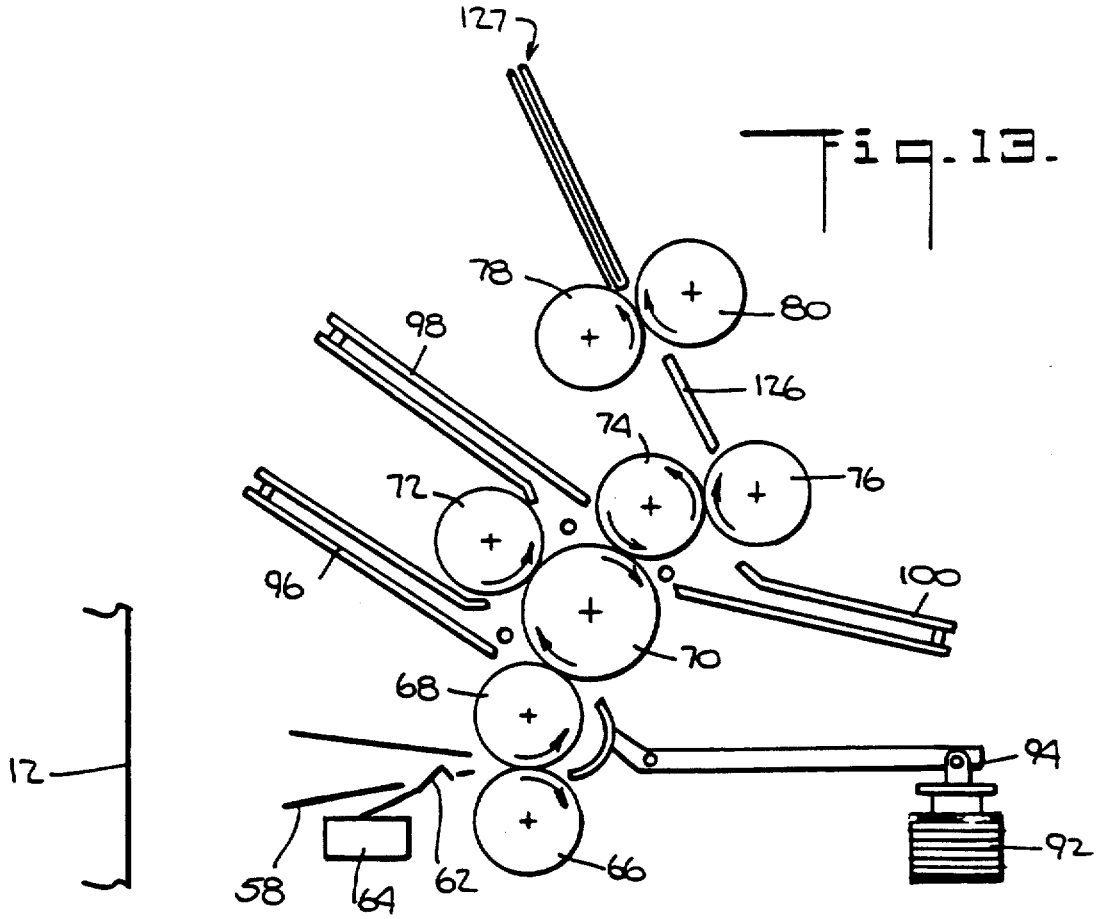

After the folding and sealing steps have been performed as shown in FIGS. 10, 11, and 12, the folded and sealed sheet 24 is passed forward as shown in FIG. 13 along a path further defined by paper guide 126 to exit roller pair 78 and 80 for being pushed outside housing 48 into the tray 52 shown in FIG. 1.

It is understood that this folding and sealing process can be carried out a theoretically unlimited number of times, although as a practical matter three such folds are preferred. Otherwise, the thickness of the folded sheet may increase to awkward and unworkable proportions as the number of folds increases.

The structural details of apparatus 10 for carrying out the folding and sealing steps described above are shown in FIGS. 3, 4, 6, 7, 8, and 9. Apparatus 10 comprises a pair of parallel upstanding side plates 130 and 132, shown partially in FIG. 6, which define a frame supporting the folding and sealing components. Housing 48 shown in section in FIG. 3 further encloses and supports said components. Feet 136 and 138 support housing 48 for placement on a suitable surface, such as tabletop 140. Housing 48 can be formed of metal or other material for securing apparatus 10 against tampering.

A sheet inlet chute 134 or paper guide 58 comprises a pair of guide surfaces 142 and 144 for receiving sheets from machine 12 through shield 44 from the exit rollers of machine 12 (not shown) through an opening 50 in housing 48. Shield 44 is designed for close communication with machine 12 to restrict the outside visibility of sheet 24 as it exits from machine 12. Lever 62 connected to trip switch 64 is disposed in inlet chute 134 for sensing the leading edge of a sheet as it is fed along chute 134.

The roller system comprises cylindrical rollers 66, 68, 70, 72, 74, 76, 78, and 80 as described above in terms of their cooperating function with respect to FIGS. 10, 11, 12, and 13. Said rollers are mounted on their respective shafts 146, 148, 150, 152, 154, 156, 158, and 160, which shafts are supported by appropriate bearings in side plates 130 and 132 for appropriate rotating motion. The rollers are selectively placed in side to side abutting relationships in various combinations for forming nips therebetween to grip sheets for the desired folding or feeding actions. Rollers 80, 76 and 66 are spring loaded by a spring member 79 against their corresponding rotatably fixed roller 78, 74 and 68 respectively. Rollers 68, 72 and 74 are rotatably fixed in engagement with the roller 70.

The drive train for said rollers is shown in FIG. 7. A 20–30 r.p.m. electric gearmotor drive 162 when activated by trip switch 64 supplies rotational kinetic energy at substantially constant angular velocity via sprocket 166 and timing chain 168 to sprocket 164 coaxially mounted on shaft 150 for turning main support roller 70. Gear 170, also coaxially mounted on shaft 150, further engages gears 172, 174, and 176 for turning rollers 68, 72, and 74 respectively. Roller 74 is in side to side abutment with roller 76 for frictionally engaging same and causing it to rotate. An O-ring driving belt 178 in combination with O-ring pulleys 179 and 181 drive roller 78. Roller 80 is frictionally engaged by roller 78. Gear 172 engages gear 180 for turning roller 66, which in turn drives bypass roller 182 through an O-ring drive belt 184 and matching pulleys 183 and 185.

Flexible belt 184 also acts to convey a sheet along said belt and out bypass exit 186 in housing 48 when paper guide 84 is moved to the bypass position by pivotable arm 88 and solenoid 92, as described above.

Figure 3:
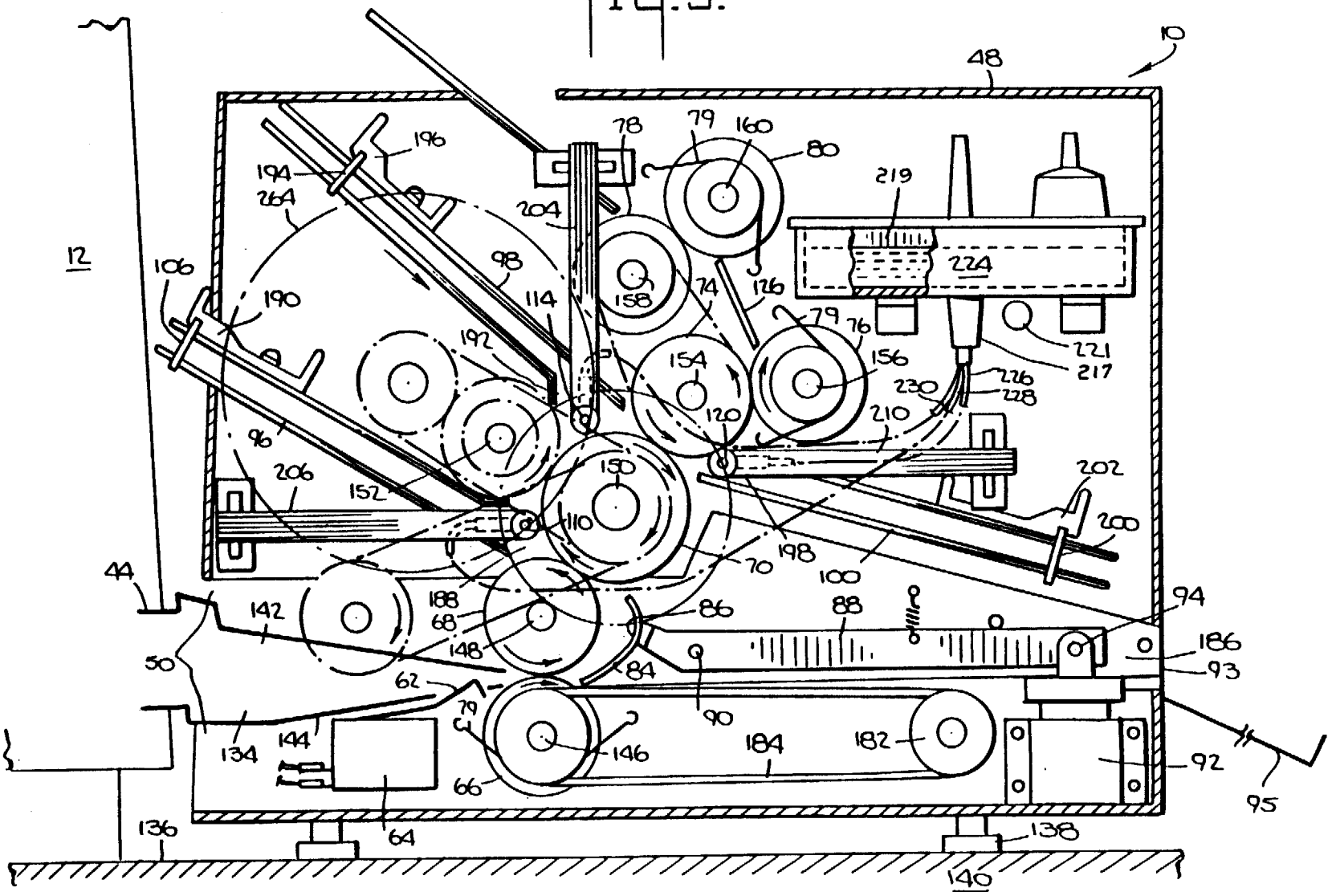
FIG. 3 is a side view with partial cutaway showing structural details of the apparatus of the present invention.

As shown in FIG. 3, shafts 146 and 148 supporting rollers 66 and 68 are placed adjacent the termination of inlet chute 134 for receiving seriatim sheets fed into chute 134 by machine 12. Guide surfaces 142 and 144 guide said sheets into the nip of rollers 66 and 68. As described above, guide surface 86 is for turning the leading edge of the sheet around and directing it into the nip of rollers 68 and 70 mounted on their respective shafts 148 and 150 adjacent and in alignment with surface 86.

Shafts 148 and 150 and their respective feed rollers 68 and 70 are disposed adjacent the inlet end 188 of buckle chute 96. Stop element 106 is slidable back and forth by adjusting means 190 positioned thereon for changing the desired length of the first fold. Buckle chute 96 causes a fed sheet to bulge, as described already above.

Roller 72 is mounted on shaft 152, roller 72 being in a side to side abutting relationship with roller 70. Rollers 70 and 72 are positioned adjacent and aligned with buckle chute 96 to cooperate therewith to form a first fold as each buckled sheet feeds between them; rollers 72 and 70 then feed the folded new leading edge of the paper sheet to the inlet end 192 of a second buckle chute 98. Stop element 194 likewise has adjusting means 196 to select the desired length of the second fold. Buckle chute 98 causes the fed sheet to buckle a second time, as already described above.

Rollers 70 and 74 are mounted on shaft 150 and 154 positioned adjacent and aligned with buckle chute 98 to cooperate therewith to form a second fold as each buckled sheet feeds between them; rollers 70 and 74 then feed the next new leading edge to the inlet end 198 of the third buckle chute 100. Stop element 200 has adjusting means 202 to select the desired length of the third, and in the preferred embodiment, final fold. Buckle chute 100 causes the fed sheet to buckle yet a third time, as already described above. Buckle chute 100 is further aligned with rollers 70 and 74 so that the third buckle forms in an opposite direction to the other two buckles, as already described above.

Rollers 74 and 76 are mounted on shafts 154 and 156 positioned adjacent and aligned with buckle chute 100 to cooperate therewith to form a third fold as each buckled sheet feeds between them; rollers 74 and 76 then feed the folded further next new leading edge forward adjacent guide surface 126 to the nip of exit rollers 78 and 80 mounted on shafts 158 and 160. Rollers 78 and 80 feed the folded sheet out through discharge opening 204 in housing 48 to tray area 52.

Figure 8:
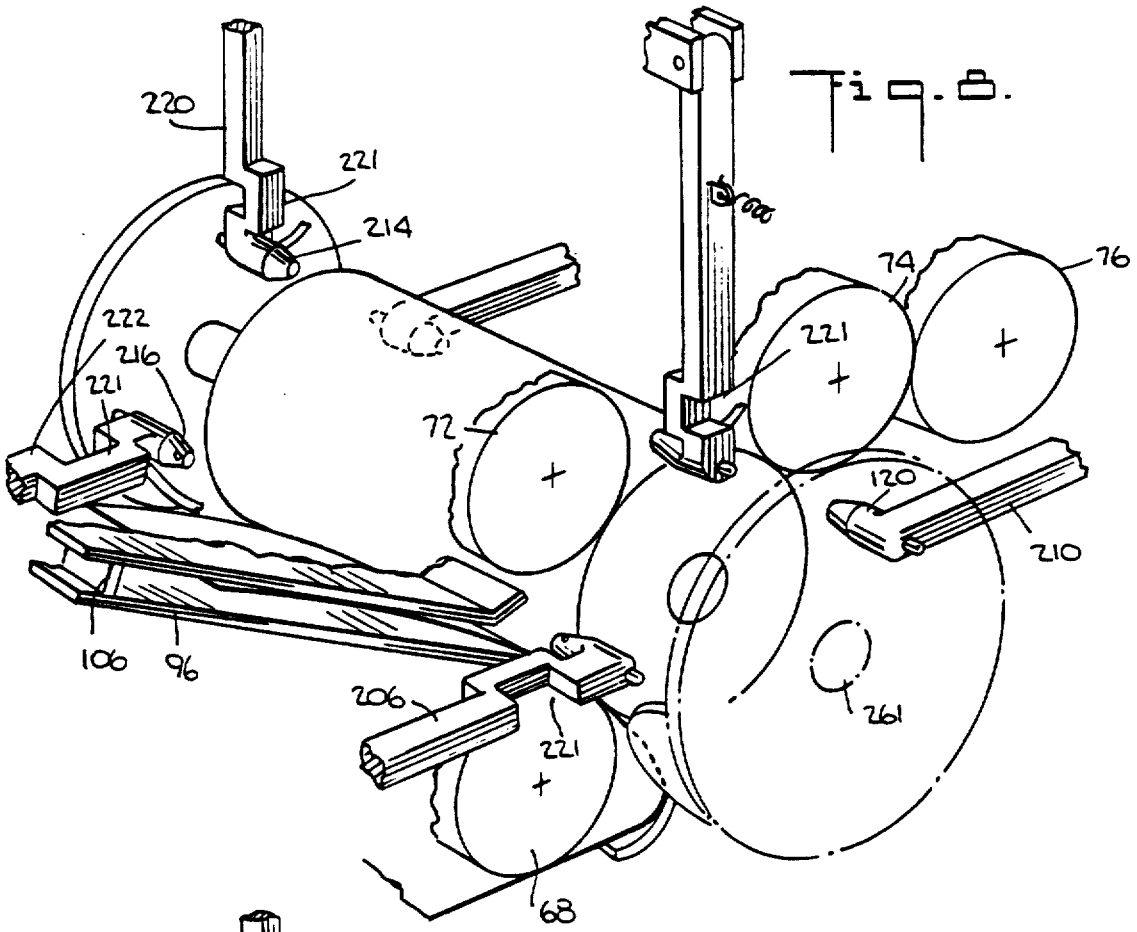
Figure 9:
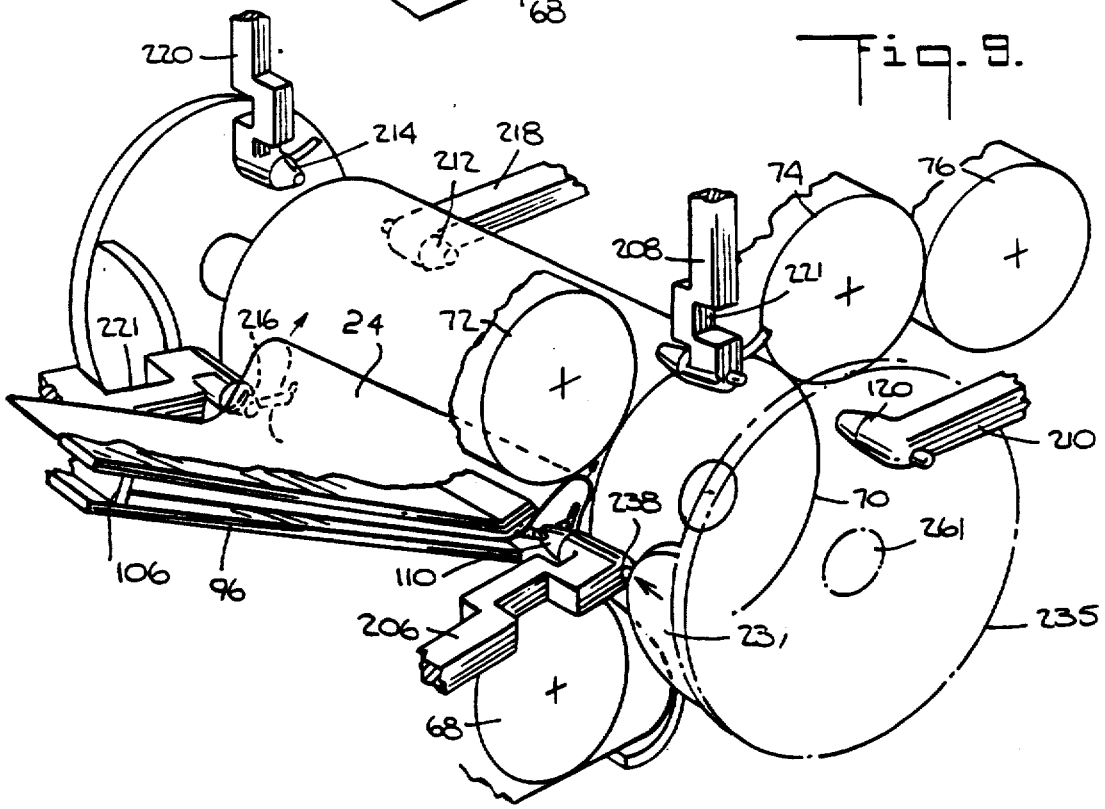

The adhesive applying system of the present invention comprises six adhesive applicators, three for each side of the sheet. If fewer folds are contemplated, then fewer applicators could be used. Three of the applicators are indicated as the adhesive applying means 110, 114, and 120 shown in FIG. 3 mounted on pivotable arms 206, 208, and 210, respectively. FIGS. 8 and 9 show these structural features, plus the additional applying means 212, 214, and 216 mounted on pivotable arms 218, 220, and 222 respectively.

As seen in FIG. 3, the adhesive, such as a liquid glue or other suitable material, is provided from reservoir 224 through tubes or lines 226, 228, 230, 232, 234, and 236 to the six applicators. The glue reservoir 224 is routinely filled by a key operator who has access to the internal portion of apparatus 10 when the exterior cover lock 54 is opened. In the preferred embodiment, the gluing system is a pressurized system having a manifold 217, which equalizes the pressure in individual lines to the respective applicators. A pad-heater 221 is used to maintain the glue in a flowable condition, and a weighted member 219 rests on top of the liquid glue reservoir 224 to provide sufficient pressure to cause the glue to flow to the applying means 110, 114, 120, 212, 214 and 216. Alternately, a parastaltic pump (not shown) may be used to provide a relatively low pressure to the manifold distribution system.

And, alternatively, glue stick applicators could be used at the various application points. These glue sticks could be easily replaceable by the key machine operator, who has access to the interior of the apparatus 10.

Figure 6:
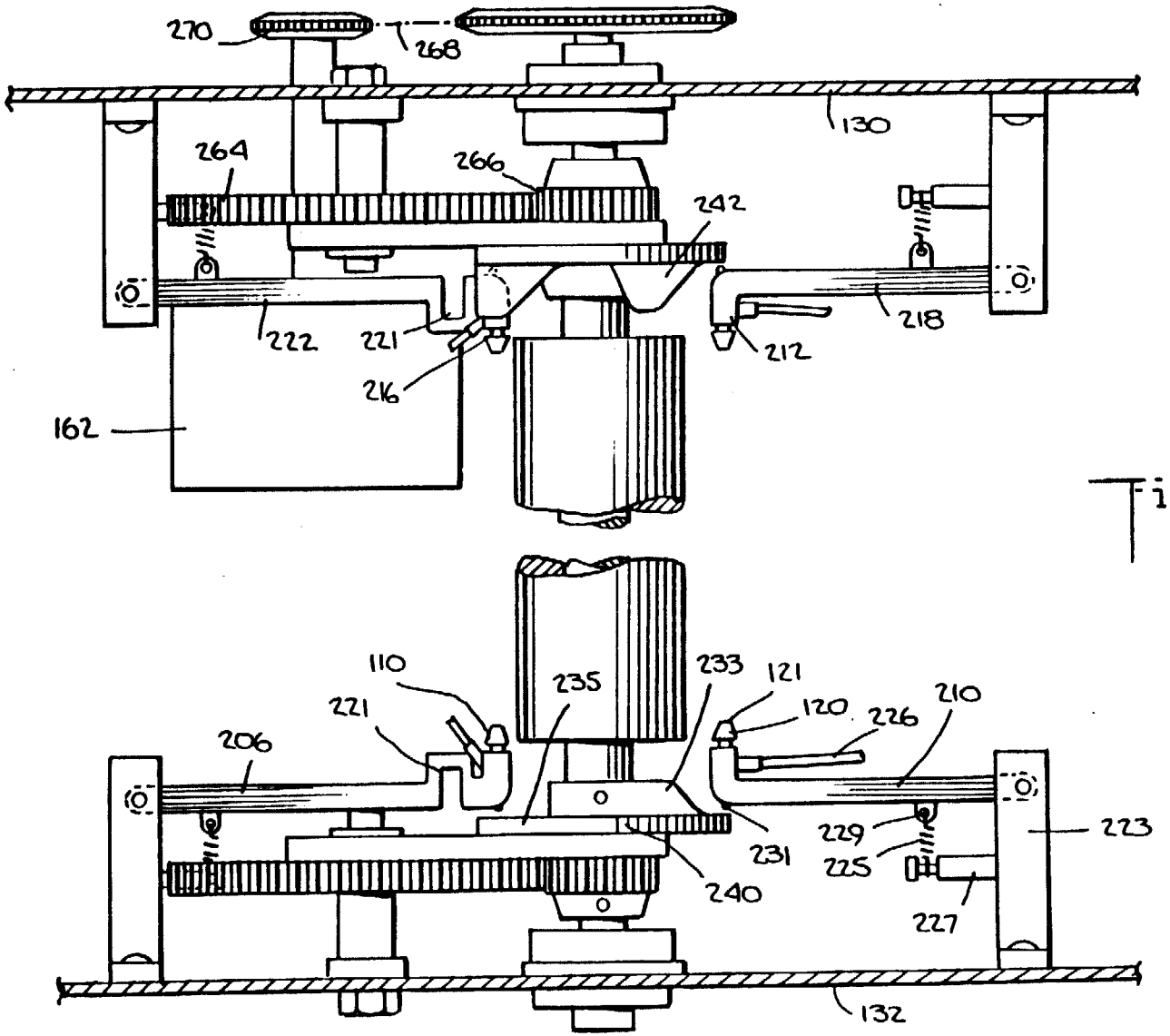
FIGS. 6, 8, and 9 show further aspects of the adhesive applying system.

FIGS. 4, 5, 6, 8, and 9 depict the details of the adhesive applicator means. Each applicator is substantially similar to every other applicator, differing only in orientation. As best seen in FIG. 6, a dispensing tip or nozzle 121 is mounted on an arm 210 pivotably mounted on supporting member 223 for in and out movement. A spring 225 affixed at one end to post 227 and at the other to tab 229 urges arm 210 away from the paper path to an inoperative position. The tip 121 is fed by adhesive or glue tube 226, and adhesive is dispensed under slight pressure at tip 121 when valve means therein (not shown) is operated to an open position by a pressing action on button 231. As shown in FIG. 9 with respect to tip 110, the tip may form two orifices, one on either side for dispensing adhesive to both portions of the sheet on either side of the fold line.

The pressing action for operating the valve means is achieved when a cam surface such as surface 233 mounted on rotatable cam 235 pushes against button 231 as cam 235 rotates about its axis during one cycle of machine operation, as described below. Also, when cam surface 233 rotates into engagement with button 231, pivotable arm 210 and likewise nozzle 121 are moved inward toward the paper path into an operative position for dispensing adhesive onto a portion of the sheet as it bulges into engagement with a roller pair.

This operative position is observed in FIG. 9, where cam surface 237 is shown engaging button 238 to move pivotable arm 206 inward to dispense adhesive from nozzle 110 onto a lateral edge portion of sheet 24. When cam 235 has continued in its rotation, such that surface 237 has passed button 238, then pivotable arm 206 will return to its inoperative position, the valve means activated by pressing button 238 will shut off nozzle 110 and wait for the next sheet to pass through.

It can be appreciated from a review of FIG. 3 in conjunction with FIGS. 6, 8, and 9, that the adhesive application mechanism of the present invention comprises three pairs of applicators, one pair for each buckle chute. One applicator of each pair is positioned on the right side, the other applicator on the left. The applicators are mounted on pivotable arms that move in and out in matched left-right pairs in sequence to apply adhesive to an edge portion of the sheet as it passes along the folding and sealing path. Accordingly, it is clear that the applicators must be synchronized or timed with the feeding of the sheet along the feeding and folding path.

The timing of the applicators is achieved by means of two cam wheels 235 and 242, one wheel 235 for the right side and one wheel 242 for the left. Cam wheels 235 and 242 are coaxially, rotatably mounted on shafts 261 and 262. The cam wheels have raised cam surfaces spaced around the perimeter thereof for engaging the pivotable arms to move them into position for dispensing adhesive at the appropriate times.

FIG. 4 shows a side view of cam wheel 242, along with the associated applicators 212, 214, and 216 mounted on pivotable arms 218, 220, and 222. Three raised cam surfaces, 224, 246, and 248, each said surface being disposed for contacting its corresponding pivotable arm, are positioned at the perimeter of cam wheel 242 and travel around shaft 262 to engage their respective pivotable arms as the cam wheel 242 rotates. Cam wheel 242 is driven by timing belt 268 and pulley 270, which in turn is driven by timing gear 264 receiving power from a mating gear 266 mounted on shaft 150.

Cam wheel 242 rotates only periodically as each sheet passes through the apparatus 10 and is timed to make one complete revolution for each sheet. That is, as a sheet enters the apparatus and is sensed by trip switch 64, a time out period begins. At the appropriate time, the cam wheel 242 is released for making one complete revolution to permit cam surfaces 244, 246, and 248 to engage each and only one of the adhesive applicators in the appropriate order on each lateral end of the machine 10. At the end of this one revolution, wheel 242 is stopped until a next sheet is properly sensed.

The timed release of wheel 242 is achieved by means of a spring clutch mechanism shown generally as 252 in FIG. 4. At the appropriate point in time as determined by the clock, an enabling signal is transmitted to solenoid 250 via cable 254. Solenoid 250 is enabled and retracts rod 256, which releases stop 260 to engage the spring clutch assembly to deliver rotational kinetic energy from timing gear 264, which receives power from main shaft 150. Then, after the cam wheel 242 has completed one revolution, the rod 256, which has returned to its extended position, engages stop 260 to release spring clutch 252 and stop the rotation of cam wheel 242.

FIG. 5 is a timing chart for the cam mechanism showing the timing of activity of each adhesive applicator. Along the vertical axis, $R_1$ corresponds to the first adhesive applicators 110 and 216 and to cam surface 244 on cam wheel 242; $R_2$ corresponds to applicators 114 and 214 and to cam surface 246 on cam wheel 242; and $R_3$ corresponds to applicators 120 and 212 and to cam surface 248 on cam wheel 242. The time t is indicated along the horizontal axis, the time t being chosen to accommodate both 14 inch and 11 inch paper. The trip switch 64 is tripped at approximately time $t=0$ and, after an appropriate time delay period corresponding to the speed of the sheet along the path of travel, the spring clutch is engaged or energized. The cam wheel begins to rotate and, after a further time delay, cam surface 244 moves into engagement with and activates applicator 216 for a fixed time period as indicated by numeral 294 in FIG. 5. Thereafter, in succession, surface 246 activates applicator 214 as indicated by numeral 296, and then surface 248 activates applicator 212. The length of the active cycles for each applicator pair $R_1$, $R_2$, and $R_3$ as depicted in FIG. 5 is chosen in conjunction with the speed at which the sheet moves along the path 82, so that an appropriately long strip of adhesive corresponding to the panel to be sealed is deposited on a lateral edge portion of the sheet. There is an offset 221 in the applicator arms 220, 222, 206 and 208 which allows the appropriate cam surfaces 244, 246 to pass by the respective arms 220, 222, and 206 and 208, thereby limiting glue application to one bulge area per sheet in timed and predetermined sequence.

Other means for activating the adhesive applying means that are well known to those of skill in the art could equally well be used. For example, the pivotable arms could be moved to and from their operative position for applying adhesive by means of appropriately placed solenoids also responsive to a timing means.

Figure 17:
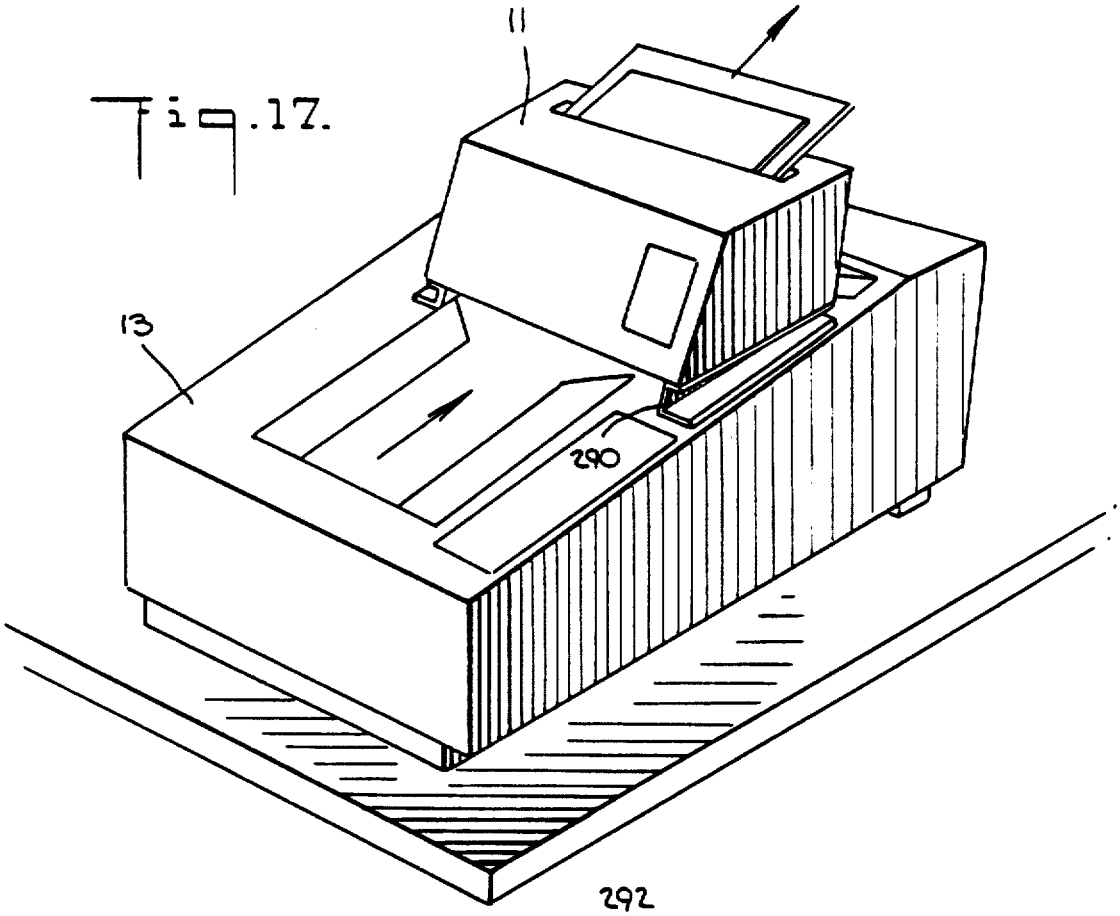
FIGS. 17 and 18 show perspective and side views respectively of an alternative arrangement of the apparatus of the present invention with respect to a facsimile machine.
Figure 18:
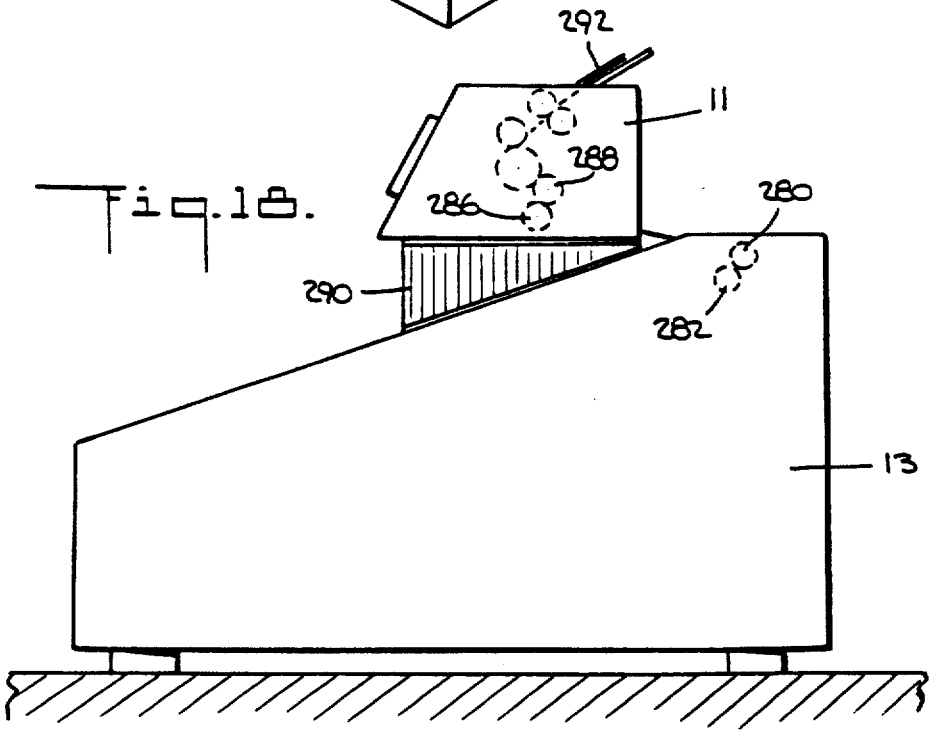

While the present invention has been described in terms of the pivotable mounting arrangement of apparatus 10 onto machine 12 as shown in FIGS. 1 and 2, other arrangements are possible. For example, FIGS. 17 and 18 show an alternative arrangement for a facsimile machine 13 where the sheet 24 exits at the top rear of machine 13 instead of the bottom front as shown in FIG. 1 In FIGS. 17 and 18, the apparatus 11 of the present invention is modified for mounting on the top rear of machine 13 on frame 290. The sheet 24 exits from machine 13 via exit rollers 280 and 282 and enters apparatus 11 through shield 284 into roller pair 286 and 288. The apparatus 11 then functions in essentially the same manner as apparatus 10 described above, with the folded and sealed sheet exiting at 292.

It is also to be understood that the invention is not limited in its application to the details of construction and arrangement of parts specifically described or illustrated, and that within the scope of the appended claims it may be practiced other wise than as specifically described or illustrated.

We claim:

1. An apparatus for enhancing the security of information applied to one side of a sheet emanating from an information reproduction means, said apparatus comprising:

(a) means for accepting a sheet from said reproduction means;

(b) means for feeding an accepted sheet into and along a path for folding and sealing said sheet;

(c) means disposed in said path for bulging a portion of said sheet trailing its leading edge as the sheet is moved along said path, the direction of the formed bulge being opposite the information side;

(d) means for applying adhesive to a portion of said sheet adjacent to the formed bulge on the information side of the sheet;

(e) means for folding the bulged portion of the sheet and passing the formed fold forward in said direction along said path as a new leading edge, whereby the portion of the sheet to which adhesive was applied is sealed face to face to a portion thereof trailing the fold to cover at least a portion of said information inside said fold; and (f) a housing having said feeding, bulging, and folding means therein, said housing having means for shielding said sheet from view as it passes from said reproduction means to said feeding means inside said housing.

2. The apparatus of claim 1, further comprising:

(a) second means disposed in said path after said folding means for bulging a portion of said sheet trailing its new leading edge as the sheet is moved further along said path;

(b) second means for applying adhesive to a second portion of said sheet adjacent the second formed bulge lying opposite the direction of the second formed bulge;

(c) means for folding the second bulged portion of the sheet and passing the second formed fold forward in said direction along said path as a next new leading edge, whereby the portion of the sheet to which adhesive was applied is sealed face to face to a second portion thereof trailing the second fold, at least a portion of said information being covered inside said folds; and (d) said second bulging, adhesive applying, and folding means also being inside said housing.

3. The apparatus of claim 2, further comprising:

(a) third means disposed in said path after said second folding means for bulging a portion of said sheet trailing its next new leading edge as the sheet is moved further along said path, the direction of the formed third bulge being opposite the information side;

(b) third means for applying adhesive to a third portion of said sheet adjacent the third formed bulge lying opposite the direction of the third formed bulge;

(c) means for folding the third bulged portion of the sheet and passing the third formed fold forward in said direction along said path as a further next new leading edge, whereby the portion of the sheet to which adhesive was applied is sealed face to face to a third portion thereof trailing the third fold, said information being covered inside said folds; and (d) said third bulging, adhesive applying, and folding means also being inside said housing.

4. The apparatus of claim 3, wherein the information further comprises confidential information and address information, said confidential information being applied to said sheet in a preselected zone and said address information being applied in a preselected region backward of said zone and adjacent the trailing edge of said sheet, said apparatus comprising:

(a) third means disposed in said path after said second folding means for bulging a portion of said sheet trailing its new leading edge as the sheet is moved along said path, the direction of the formed third bulge being toward the information side trailing the second folded portion;

(b) means for folding the third bulged portion of the sheet and passing the third formed fold forwards in said direction along said path as a further next new leading edge, whereby the portion of the sheet to which adhesive was applied is sealed face to back to a third portion thereof trailing the third fold, said confidential information being covered inside said folds and said address information being exposed to view outside said folds; and (d) said third bulging, adhesive applying, and folding means also being inside said housing.

5. The apparatus of claim 4, further comprising means adjacent said reproduction means for movably supporting said housing to be displaceable to and from a position for accepting said sheet from said reproduction means, said housing further comprising means for locking said housing into said operative position.

6. The apparatus of claim 5, wherein the reproduction means comprises a means for receiving facsimile information and said receiving means comprising means for storing said address information and applying said address information to said region.

7. The apparatus of claim 3, wherein said feeding means comprises at least one pair of cooperating rollers for moving said sheet therebetween in the nip of said rollers, said bulging means comprise buckle chutes, said adhesive applying means comprise at least one nozzle connected to an adhesive reservoir by at least one conduit, said nozzle being mounted on a cam operated arm pivotably mounted for moving to an operative position for dispensing adhesive in response to said cam operation, and said folding means comprises at least one pair of cooperating rollers for grasping said bulged portions in the nip thereof to fold them and pass them forward.

8. The apparatus of claim 7, further comprising bypass means displaceable into or out of said path before said first bulging means, said bypass means being displaceable into said path for guiding said sheet into the folding and sealing means and displaceable out of said path for permitting said sheet to bypass said folding and sealing means.

9. An apparatus for enhancing the security of information applied to one side of a sheet emanating from an information reproduction means, said apparatus comprising:

(a) first and second cylindrical rollers rotatably mounted in a side to side abutting relationship to form a first nip therebetween, said first and second rollers for receiving a sheet in said first nip thereof and rotating cooperatively to feed said sheet in a forward direction;

(b) a first sheet turnaround guide surface displaceable to and from an operative position for deflecting said sheet through a further series of folding and sealing rollers;

(c) a cylindrical support roller rotatably mounted in a side to side abutting relationship with said second roller to form a second nip therebetween, said second nip being aligned with said guide for receiving said sheet in said second nip, said second and support rollers for rotating cooperatively to feed said sheet in said forward direction;

(d) a first buckle chute aligned with said second nip for receiving said sheet therein and causing said sheet to bulge in a direction opposite the information side;

(e) a third cylindrical roller rotatably mounted in a side to side abutting relationship with said support roller to form a third nip therebetween, said third nip being aligned with said first buckle chute for receiving in said third nip the formed bulge caused by said first buckle chute, said third and support rollers for rotating cooperatively for folding said bulge so that at least a portion of said information is concealed inside said fold and feeding said sheet further forward; and (f) a first pair of adhesive applicators mounted adjacent said third nip on a pair of pivotable arms, one such arm and its associated applicator being for each of the two lateral sides of the sheet, said arms being cam actuated for displacement in unison to and from an operative position for dispensing adhesive to lateral edge portions of both edges of said sheet on said information side, so that said fold is sealed as it is formed to conceal said information inside said fold.

10. The apparatus of claim 9, further comprising:

(a) a second buckle chute aligned with said third nip for receiving said folded sheet therein and causing said sheet to bulge in a direction opposite to the information side;

(b) a fourth cylindrical roller rotatably mounted in a side to side abutting relationship with said support roller to form a fourth nip therebetween, said fourth nip being aligned with said second buckle chute for receiving in said fourth nip the second formed bulge caused by said second buckle chute, said fourth and support rollers for rotating cooperatively for folding said second bulge so that at least a further portion of said information is concealed inside said second fold and feeding said sheet further forward; and (c) a second pair of adhesive applicators mounted adjacent said fourth nip on a further pair of pivotable arms, one such arm and its associated applicator being for each of the two lateral sides of the sheet, said arms being cam actuated for displacement in unison to and from an operative position for dispensing adhesive to lateral edge portions of both edges of said sheet, so that said second fold is sealed as it is formed to conceal said information inside said fold.

11. The apparatus of claim 10, further comprising:

(a) a third buckle chute aligned with said fourth nip for receiving said folded sheet therein and causing said sheet to bulge in a direction toward the information side;

(b) fifth and sixth cylindrical rollers rotatably mounted in a side to side abutting relationship with each other to form a fifth nip therebetween, said fifth nip being aligned with said third buckle chute for receiving in said fifth nip the third formed bulge caused by said third buckle chute, said fifth and sixth rollers for rotating cooperatively for folding said third bulge so that at least a portion of said information adjacent the trailing edge of the sheet is exposed outside said third fold, and feeding said sheet further forward; and (c) a third pair of adhesive applicators mounted adjacent said fifth nip on a further pair of pivotable arms, one such arm and its associated applicator being for each of the two lateral sides of the sheet, said arms being cam actuated for displacement in unison to and from an operative position for dispensing adhesive to lateral edge portions of both edges of said sheet, so that said third fold is sealed as it is formed to expose at least a portion of said information outside said fold.

12. The apparatus of claim 11, further comprising a housing for enclosing said rollers, buckle chutes, and applicator means, said housing having a shield for mating with said reproduction means to conceal said sheet from view as it passes from said reproduction means into said first nip.

*13. An apparatus for enhancing the security of information applied to one side of a sheet emanating from an information reproduction means, said sheet further including address information, said apparatus comprising:*

*a) means for selectively accepting a sheet from said reproduction means;*

*b) means for feeding an accepted sheet along a first path for folding said sheet;*

*c) means, disposed in said first path for folding said accepted sheet so that said address information is visible and said applied information is concealed when said accepted sheet is output; and*

*d) means for feeding a non-accepted sheet along a second path for unfolded output;*

*e) whereby said reproduction means may be selectively used in either a normal mode of operation, or in a secure mode of operation wherein said sheet may be delivered in accordance with said address information and disclosure of said applied information is avoided as said sheet is handled during delivery.*

*14. Apparatus as described in claim 13 wherein said folding means further comprises means for sealing said accepted sheet as it is folded.*

*15. Apparatus as described in claim 14 wherein said information reproduction means is a facsimile system.*

*16. Apparatus as described in claim 15 wherein said accepting means is controlled by an operator of said system.*

*17. Apparatus as described in claim 16 wherein said sealing means further comprises means for applying liquid glue to said accepted sheet.*

* * * * *